(12) United States Patent
Schlack

(10) Patent No.: US 11,033,141 B2
(45) Date of Patent: Jun. 15, 2021

(54) DEVICE FOR PREPARING BABY FOOD

(71) Applicant: Stefan Schlack, Göttingen (DE)

(72) Inventor: Stefan Schlack, Göttingen (DE)

(73) Assignee: SMIICS GmbH, Göttigen (DE)

(*) Notice: Subject to any disclaimer, the term of this patent is extended or adjusted under 35 U.S.C. 154(b) by 175 days.

(21) Appl. No.: 16/070,084

(22) PCT Filed: Jan. 11, 2017

(86) PCT No.: PCT/EP2017/000030
§ 371 (c)(1),
(2) Date: Jul. 13, 2018

(87) PCT Pub. No.: WO2017/121638
PCT Pub. Date: Jul. 20, 2017

(65) Prior Publication Data
US 2019/0029461 A1    Jan. 31, 2019

(30) Foreign Application Priority Data
Jan. 14, 2016 (DE) ..................... 10 2016 000 406.1

(51) Int. Cl.
A47J 31/40    (2006.01)
A23L 33/00    (2016.01)
A23L 2/39    (2006.01)

(52) U.S. Cl.
CPC ............. *A47J 31/401* (2013.01); *A23L 33/40* (2016.08); *A47J 31/404* (2013.01); *A47J 31/407* (2013.01); *A23L 2/39* (2013.01); *A47J 31/402* (2013.01)

(58) Field of Classification Search
CPC ........ A47J 31/40; A47J 31/401; A47J 31/402; A47J 31/404; A47J 31/407
USPC ........ 99/289 R; 222/146.5, 129.1, 96, 129.3, 222/135
See application file for complete search history.

(56) References Cited

U.S. PATENT DOCUMENTS

| | | | |
|---|---|---|---|
| 4,576,603 A | 3/1986 | Moss | |
| 4,620,794 A * | 11/1986 | Leka | B01F 15/0404 222/137 |
| 5,241,898 A * | 9/1993 | Newnan | A47J 31/42 241/100 |
| 5,570,816 A | 11/1996 | LaBarbera, Jr. | |
| 5,797,313 A | 8/1998 | Rothley | |
| 6,173,117 B1 * | 1/2001 | Clubb | A47J 31/401 222/146.5 |
| 6,837,397 B2 * | 1/2005 | Lassota | A47J 31/404 222/129.3 |
| 7,406,278 B2 * | 7/2008 | Katsuyama | G03G 15/0874 222/DIG. 1 |

(Continued)

FOREIGN PATENT DOCUMENTS

| | | |
|---|---|---|
| CN | 1615100 A | 5/2005 |
| CN | 1942392 A | 4/2007 |

(Continued)

*Primary Examiner* — Reginald Alexander
(74) *Attorney, Agent, or Firm* — Dilworth & Barrese, LLP

(57) ABSTRACT

The invention relates to a device for preparing baby food, in particular baby formula or baby purees. The invention also relates to the use of a corresponding device for preparing a solution or suspension, or baby food, and to a metering and sterilizing pouch and a preparation unit for a corresponding device.

13 Claims, 15 Drawing Sheets

(56) References Cited

U.S. PATENT DOCUMENTS

| | | | |
|---|---|---|---|
| 8,230,774 B1 * | 7/2012 | Hunte | A47J 31/401 222/129.4 |
| 2003/0024948 A1 | 2/2003 | Last | |
| 2006/0157463 A1 | 7/2006 | Wiele et al. | |
| 2006/0278093 A1 * | 12/2006 | Biderman | A47J 31/52 99/282 |
| 2008/0110935 A1 * | 5/2008 | Huber | A47J 31/465 222/221 |
| 2009/0151574 A1 | 6/2009 | Nijboer et al. | |
| 2010/0133222 A1 | 6/2010 | Mathieu | |
| 2011/0163127 A1 * | 7/2011 | DiBella-Lenaway | A47J 31/401 222/145.6 |
| 2012/0088022 A1 | 4/2012 | Carbone et al. | |
| 2012/0295001 A1 | 11/2012 | Nijboer et al. | |
| 2013/0112081 A1 * | 5/2013 | Nelissen | A47J 31/401 99/285 |
| 2013/0306672 A1 | 11/2013 | White | |
| 2016/0353917 A1 | 12/2016 | Carbone et al. | |

FOREIGN PATENT DOCUMENTS

| | | | |
|---|---|---|---|
| CN | 101541218 A | 9/2009 | |
| CN | 101657130 A | 2/2010 | |
| CN | 102164843 A | 8/2011 | |
| CN | 102481013 A | 5/2012 | |
| CN | 10257358 A | 7/2012 | |
| CN | 202778391 U | 3/2013 | |
| CN | 104203057 A | 12/2014 | |
| CN | 104869972 A | 8/2015 | |
| DE | 2944333 A1 | 5/1980 | |
| DE | 202007001767 U1 | 4/2007 | |
| DE | 60221715 T2 | 4/2008 | |
| DE | 102010003974 A1 | 7/2011 | |
| GB | 2060401 A | 5/1981 | |
| GB | 2176280 A | 12/1986 | |
| WO | WO-9603067 A1 * | 2/1996 | A47J 31/401 |
| WO | 01/49154 A1 | 7/2001 | |
| WO | 2007/135608 A2 | 11/2007 | |
| WO | 2010/148160 A2 | 12/2010 | |
| WO | 2014/164086 A1 | 10/2014 | |

* cited by examiner

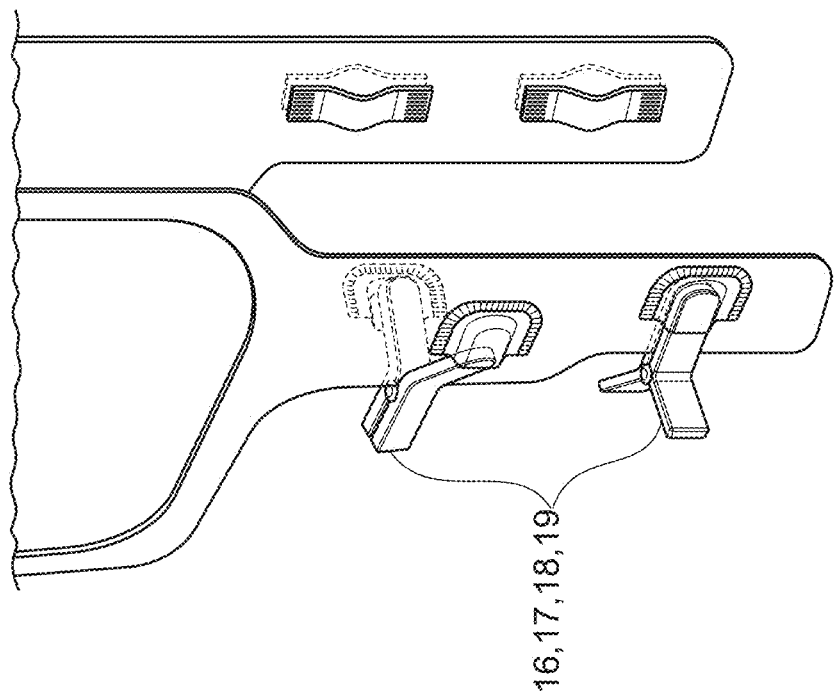
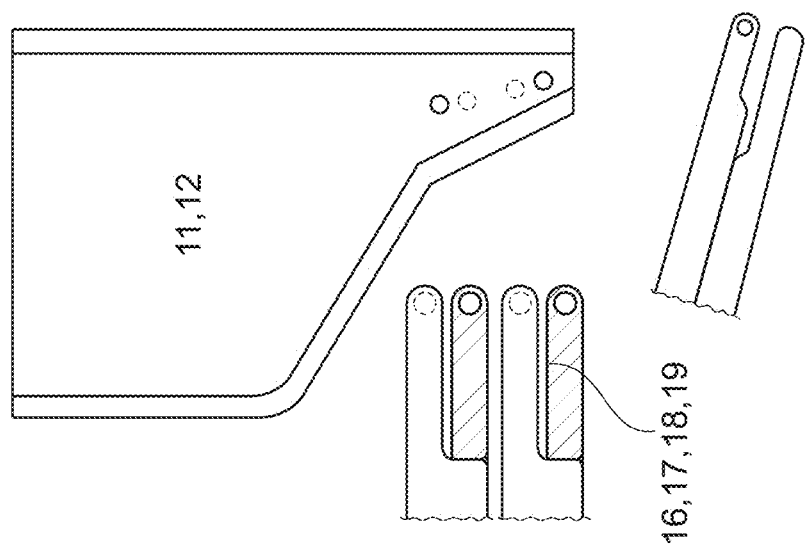

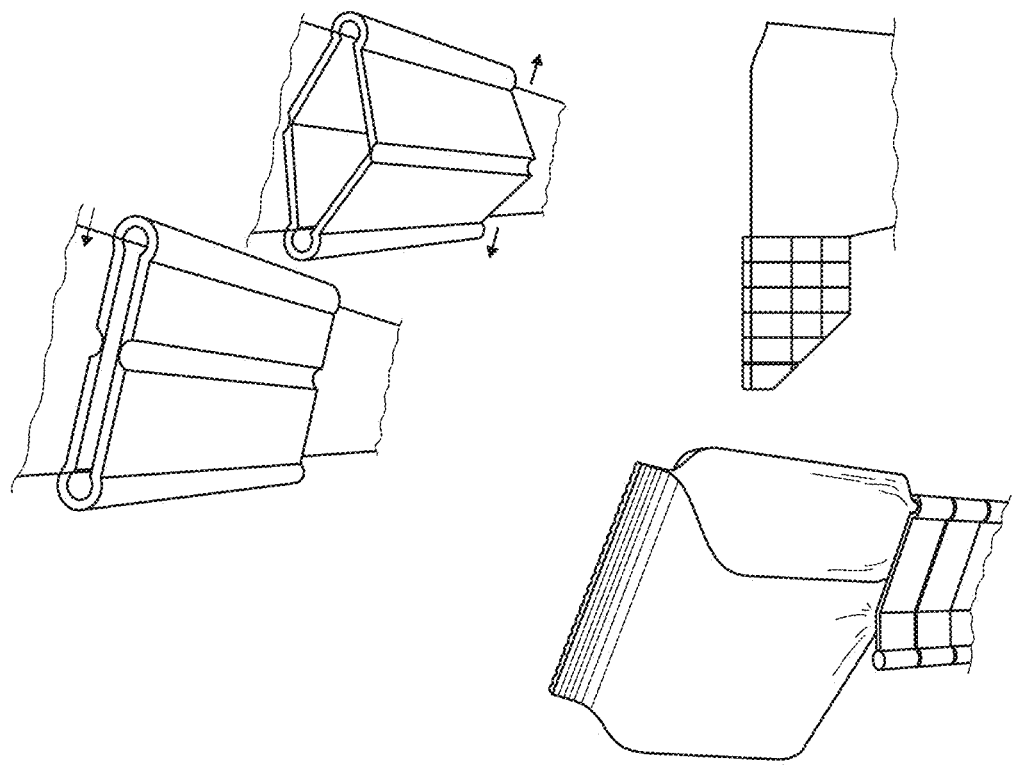
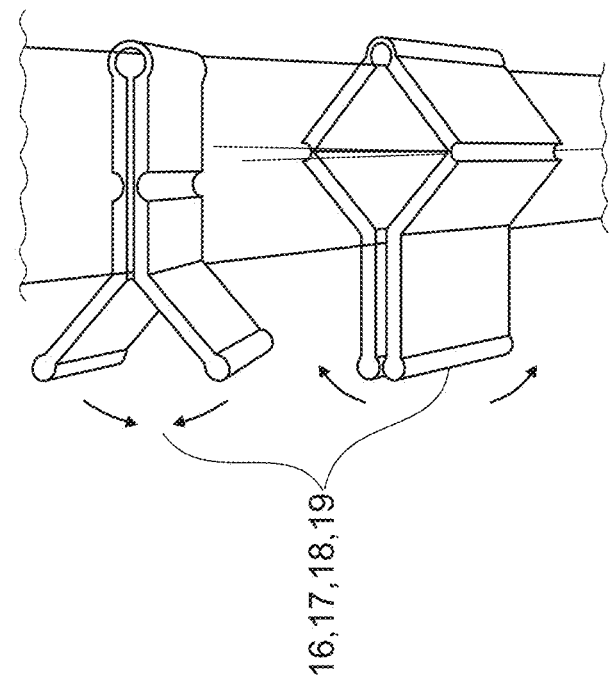
Fig. 9

DEVICE FOR PREPARING BABY FOOD

BACKGROUND OF THE INVENTION

The invention relates to an apparatus for preparing baby food, in particular baby formula, baby purees, etc.

When preparing baby food from baby food concentrate, water is heated, a corresponding amount of concentrate is measured and is prepared or mixed with the heated water before the feeding of the food.

The preparation in this respect means that the individual ingredients are mixed or are dissolved in one another, are heated, or are made ready to eat in a different manner.

This frequently also takes place during the night, with the person who carries out the preparation of the food frequently having a reduced power of concentration due to fatigue associated with baby care. It is in particular disadvantageous here that the activity of food preparation is considered laborious and that there is the risk of scalding or injury for the person carrying out the preparation when working with heated liquid.

SUMMARY OF THE INVENTION

It is therefore the object of the present invention to provide an apparatus by means of which the preparation of baby food, in particular baby formula, is simplified and made considerably safer.

This object is achieved in accordance with the invention by an apparatus for preparing baby food having features herein; advantageous embodiments are the subjects of the description herein. An apparatus is accordingly provided having at least one first connector for connection to at least one source of baby food concentrate, having at least one second connector for connection to at least one source of liquid, in particular a source of water, in particular at least one heating device for heating the liquid and/or the baby food, at least one preparation device for preparing the liquid and the baby food concentrate, and at least one outlet for filling the liquid and the baby food concentrate into a baby bottle.

In accordance with the invention, it is thus possible by means of the apparatus to fill a baby bottle with baby food that is correctly prepared and is ready for giving to the baby at a corresponding temperature. The preparation of the baby food, that is laborious under certain circumstances, is dispensed with by the automation or simplification of the preparation procedure caused by the apparatus.

In accordance with the invention, the source of liquid can also comprise two separate liquid containers of which one can be filled with cold liquid and one with warm or hot liquid. The liquid containers can be thermally insulated here. To prepare the baby food, the baby food concentrate or the concentrate can first be introduced into the baby bottle manually or in a different manner. The baby bottle itself can accordingly be the source of the baby food concentrate in such an embodiment. The water stored in the two liquid containers can be introduced into the baby bottle in a certain ratio at an optionally later time, with a mixing apparatus being able to be provided that ensures that the water mixed in the baby bottle has a desired temperature. The cold water and the warm or hot water of the two liquid containers can be mixed in a corresponding ratio for this purpose. Thermometers can here detect the temperatures in the liquid containers and/or in the baby bottle and the mixing apparatus can mix the required amounts of hot and cold water itself or can display the ratio in which the water is to be mixed to a user to obtain a desired drinking temperature. The baby food can then be correspondingly prepared or mixed by means of the preparation device.

The outlet or also two separate outlets for the liquid and for the baby food concentrate can be arranged here such that no mixing at all or the complete mixing of the baby food concentrate and the liquid takes place within the apparatus. For this purpose, the outlets can be provided separately at the preparation device such that the baby food concentrate and the liquid are introduced into the baby bottle separately from one another. For this purpose, the outlets can be provided separately from one another at a side of the preparation device that faces the baby bottle or at a side to which the opening of the baby bottle can be connected.

Alternatively or additionally, it is also conceivable that the separate outlets are provided within a tube or within a plurality of tubes, with the tube or tubes being able to comprise a common inlet or inlet region for letting the liquid and/or the baby food concentrate into the baby bottle. The two outlets can here be provided within the apparatus and not open separately into the container or into the baby bottle, but rather into a mixing and/or pumping apparatus or other receptacle located upstream of the container.

The heating device can here be configured such that the liquid and/or the baby food is/are heated to a temperature suitable for feeding of, for example, less than 50° C., in particular between 20° C. and 45° C., particularly preferably 37° C.±5° C. The apparatus can enable a mixing of e.g. baby formula concentrate and water only within the container. This can be achieved in that the preparation device is couplable to the container such that the concentrate and the water are filled into the container still separate from one another and the preparation of the baby formula or the mixing of the baby formula concentrate and the water only takes place after the filling of the individual components into the container and within the container. It is also possible for the user with this apparatus to use any desired commercial baby milk powder or concentrate. Alternatively or additionally, an embodiment is conceivable in which the heating device is configured to boil the liquid and/or the baby food or to heat it to approximately 100° C. The heating device can thus be used in combination with a metering and sterilizing bag for sterilizing the respective substances.

Provision is made in accordance with the invention that at least one tube or tube section, preferably replaceable, is provided for conducting the baby food concentrate and/or the baby food and/or the water and/or another liquid dissolving the baby food concentrate. It is also conceivable that the source of baby food concentrate and/or the source of liquid and/or the container are replaceable components of the apparatus and/or consist of a combined bag and tube kit or are connected to such. Such bag and tube kits that are in particular produced in one piece can here have a tube section and a bag section that is, for example, more voluminous in comparison therewith. The above-named replaceable tube section can relate to such a tube section belonging to a combined bag and tube kit. The bag section can alternatively or additionally have a larger cross-section that the tube section. Bag and tube kits thus require less storage space and can furthermore be coupled to the apparatus using fewer components to be connected. A separate tube can in particular be dispensed with.

If tubes are used, they can be formed as reusable tubes or as disposable parts. The observation of required hygiene standards can be facilitated by a corresponding replacement or cleaning of the tubs and of the source of concentrate and the source of water. The source of baby food concentrate and/or the source of liquid and/or the baby bottle can furthermore comprise bags, tube kits and/or bag/tube kits or can be connected thereto, with said components being able to be flexible and thus requiring an advantageously small storage space. A embodiment can also be meant by this in which a metering and sterilizing bag such as is described further below is formed in one piece with a corresponding tube or tube section for the liquid and/or for the baby food concentrate or is identical to the tube section, with the tube being able to be encompassed by or pressed off from the clamps described in more detail in the following or by or of from a device analog to the clamps to meter the contents of the bag.

It is conceivable in a further advantageous embodiment that at least one filter is provided for cleaning and/or sterilizing the liquid, in particular the water. The filter can here be provided between the source of the liquid and the outlet of the apparatus so that liquid can be correspondingly filtered or sterilized when flowing through the apparatus. The filter is preferably designed such that the liquid is filtered or sterilized before it comes into contact with the concentrate. The filter can also be directly attached to the preparation device. The preparation device can furthermore be directly connected to the container (baby bottle), optionally with the aid of an adapter. A closed system of container and preparation device hereby results. The connection can take place directly after the sterilization/autoclaving of both parts. The preparation device together with the bottle can be connected to the water tubes and concentrate tubes for filling. The boiling of the water for the purpose of sterilization can be omitted by using a corresponding sterile filter.

It is alternatively conceivable that the preparation device represents a component of the apparatus and can be connected to the container via a baby bottle attachment. The preparation device would also be conceivable as a replacement component in this case or parts thereof could be designed as replacement components or as disposable components. The filter itself can here like the tubes and the container and the source of liquid and the source of baby food concentrate be designed as disposable parts.

It is conceivable in a further advantageous embodiment that the preparation device comprises at least one agitator and/or at least one spray nozzle and/or that the preparation device is configured as a replaceable wear part. The preparation here can include the mixing of the baby food concentrate with the liquid and the dissolving of the baby food concentrate in the liquid. The concentrate can be a solid, in particular a powder or a concentrated liquid.

The agitator can be configured here such that it engages into a container that can be positioned in the region of the outlet of the apparatus. The agitator can furthermore be driven to rotate, with the rotation of the agitator being effected by a fluid flow or by a drive of its own such as a motor of the agitator.

It is conceivable in a further advantageous embodiment that the first connector comprises an injection needle for injecting into the baby food concentrate source. The injection needle can here, like the lines and further parts of the apparatus, also be configured as a disposable article for a better ensuring of hygienic standards. The needle can furthermore be produced from plastic. A total of three needles or also more or fewer needles that can be introduced into the individual sources of ingredients (source of baby food concentrate, source of liquid) and into the container to be filled with the baby food to ensure hygienic standards can be provided at the apparatus.

It is conceivable in a further advantageous embodiment that at least one pump is provided to supply the baby food concentrate and/or the liquid and/or that means are provided that are configured such that the baby food concentrate and/or the liquid are supplied for preparation by gravity.

Provision is furthermore made in accordance with the invention that a metering apparatus is provided that is configured for the metering of the concentrate and/or of the liquid and in particular comprises clamps displaceably arranged at the tube or tube section. These clamps can be electronically or manually controlled via a control/regulation device. The term of clamps is to be given a wide interpretation here and can include any and all components of the metering device that can interact with a section of the tube and/or of the tube section that is in particular flexible to meter the content provided therein. The metering device can accordingly comprise vibrating rollers, a vibrating wedge, a vibrating spoon or similar that enable a metering of the powder in interaction with the flexible section.

The metering is accordingly possible in a flexible material that can be clamped off, for example in a bag, in a tube or in a tube/bag combination, etc. for water and powder or concentrate. If water is metered in, it is possible in this respect to carry out a combination of metering and sterilization of the water within the material that has been clamped off.

The metering or a combination of metering and sterilization can, for example, be achieved by displaceable clamps, but also by a rotating wheel or wheels, by a wedge or wedges, etc. A combination of a clamping off of an upper clamp or of clamps arranged above a valve and a corresponding actuation of the valve on the discharge of the liquid or of the concentrate would also be conceivable.

In this respect, the metering device can be configured to squeeze the tube and/or the tube section closed from the outside in defined positions by said clamps and thereby in particular to meter desired amounts of the content contained therein between the points squeezed closed. The metering device can alternatively or additionally also be configured as a device that, for example, outputs fixed metering amounts into the baby bottle manually by actuating a corresponding actuation section. Such a metering can also be described as taking place in accordance with the stroke principle. A desired metering amount can here take place manually or automatically via the correspondingly frequent actuation of the actuation section. If is, for example, conceivable that the baby food concentrate is filled into the baby bottle manually or by means of the actuation section, whereas the liquid addition takes place at a later, predefined point in time, in particular automatically, and the preparation of the baby food is likewise carried out automatically.

It is conceivable in a further advantageous embodiment that a control/regulation device is provided by means of which the apparatus can be operated, in particular remotely operated. The control/regulation unit can here comprise a display panel or a display and can furthermore be able to be complemented in a modular manner by special complementary modules. A complement of the control/regulation device by a wireless LAN module is conceivable to enable the remote control of the total apparatus. The control/regulation device can control/regulate all the steps required for the preparation such as the metering of the components, the heating of the liquid, and the stirring or preparing or mixing of the components.

An embodiment is also conceivable in which some or all of the functions of the apparatus can be set manually, that is without using a control/regulation device. The amount of powder or amount of baby food concentrate can be set, for example, via at least one rotary knob that can be rotated to space the corresponding clamps apart from one another and/or to open and/or close the clamps. To set the amount of liquid, at least one separate rotary knob can likewise correspondingly be used or a transmission apparatus can be provided between the components for setting the source of the baby food concentrate and the components for setting the amount of liquid, said transmission apparatus comprising, for example, a translation device or a translation wheel that automatically adapts or couples the clamps provided for metering the liquid to the clamps provided for metering the concentrate. Expensive and error-prone electronic components can thus advantageously be omitted.

The switching on of the apparatus can also take place with a manual or partly manual control/regulation via an app, for example, with the apparatus being able to prepare the manually set metering amounts.

A water preparation module can furthermore be added that makes it possible to prepare mains water and thus to use it directly. This module and further modules are here simply connectable, in particular by latching in, to the central unit or to the control/regulation device or to the total apparatus. The control/regulation device can be integrated in the total apparatus or can also be provided as an external device. It can here communicate with the total apparatus or with the individual components of the apparatus wirelessly or via corresponding lines.

It is furthermore conceivable that the apparatus has means, in particular a scanner, for reading information of the source of the baby food concentrate and/or that a baby bottle attachment is provided to couple the container to the preparation device or to the apparatus. The read data can then be used by the control/regulation device to correspondingly carry out the preparation procedure. For this purpose, the source of the baby food concentrate is provided with a barcode or with another information means that includes the readable information, e.g. a drinking amount and metering table. A manual input of the recipe into the control unit is also conceivable.

A baby bottle or the container can be coupled to the apparatus by means of the baby bottle attachment or using the preparation device, optionally also using an additional adapter, such that the preparation of the baby food can be carried out within the container. For this purpose, the container can, for example, be screwed or clipped onto the preparation device or can be connected via a baby bottle attachment. The baby bottle attachment can here be formed in one piece with the preparation device and can, for example, have a thread for screwing on a baby bottle. A closed system of container and preparation device hereby results. An adapter can optionally be used to couple all or some of the baby bottles available on the market to the preparation device. The preparation device together with the bottle is connected to the water tubes and concentrate tubes for filling. In an embodiment having a combined metering and sterilizing bag, the preparation device can be correspondingly connected to an opening of such a metering and sterilizing bag. Alternatively, the baby bottle together with the baby bottle attachment is connected to the preparation device present at the apparatus. After the preparation of the baby formula, the preparation device and/or the attachment can be separated from the container and the container can be provided with a nipple attachment or with another attachment for the consumption or safe storage of the container content.

It is conceivable in a further advantageous embodiment that the source of the baby food concentrate and/or the source of liquid is/are connected to the connectors of the apparatus, i.e. this aspect of the invention does not relate to the apparatus as such, but rather to the apparatus with the source of baby food concentrate and/or the source of liquid arranged thereon or therein.

The invention is also directed to the use of an apparatus for preparing baby food and for preparing a mixture or generally a solution or a suspension and to the use of a source of baby food concentrate in or with an apparatus.

The invention is also directed to a metering and sterilizing bag for an apparatus in for preparing a suspension and/or an emulsion, in particular baby food such as baby formula, wherein the metering and sterilization bag comprises at least two connectors for conducting a liquid in and out.

The invention is furthermore directed to a preparation device for an apparatus, wherein the preparation device is couplable to a container and comprises an agitator that is configured for stirring the content of the container coupled to it. The metering and sterilizing bag and the preparation device can comprise further features that are explained in the description.

BRIEF DESCRIPTION OF THE DRAWINGS

Further advantages and details are explained with reference to the embodiments explained by way of example in the Figures. There are shown:

FIG. 7: a container of a source of baby food concentrate and/or of a source of liquid with a metering line;

FIGS. 8-12: a container having different devices for coupling the container with clamps;

DESCRIPTION OF THE PREFERRED EMBODIMENTS

Figure 1:
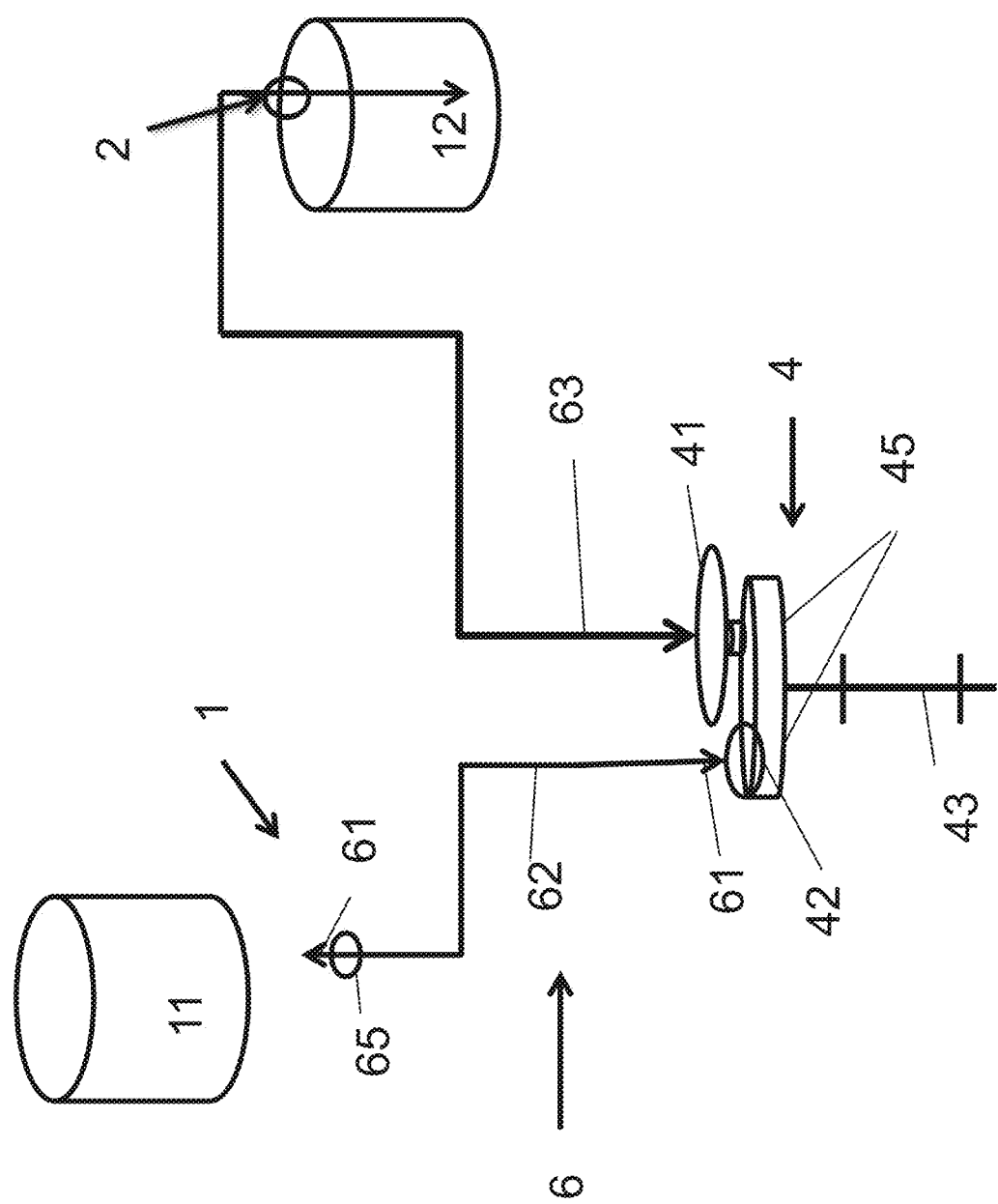
FIG. 1: a schematic design of an apparatus in accordance with the invention.

FIG. 1 shows the schematic design of an apparatus in accordance with the invention for preparing baby formula. The embodiment correspondingly also relates to the preparation of any desired other baby food or drink.

A first connector 1 for connecting the apparatus to at least one source 11 of baby formula concentrate is shown here. The source 11 of baby formula concentrate can, for example, be a bag of baby formula powder. A second connector 2 for connection to at least one source 12 of liquid can be used for connecting the apparatus to a source of water, for example.

The terms of first and second connectors 1, 2 are to be given a broad interpretation in the present case. They can designate any features that make it possible to connect the source 11 of baby formula concentrate and the source 12 of liquid to the apparatus. The connectors 1, 2 can here be part of the preparation device 4 or part of other sections of the apparatus in accordance with the invention. The connectors 1, 2 can be coupled to the outlet or outlets, with the connectors 1, 2 being able to be part of the tube or of the tube section.

A preparation device 4 is shown in the lower region of the FIG. 1 that is adapted for the preparation, in particular the mechanical preparation, of the liquid and of the baby formula concentrate. The preparation device 4 can here have at least two outlets for filling the liquid and the baby formula concentrate into a container 10 not shown in FIG. 1. The preparation device 4 and the container 10 can be connected to one another here.

A septum 42 can be provided at the preparation device 4 through which an injection needle 61 can be pierced to transfer the baby formula concentrate or the powder into the container 10. This needle 61 can be produced from plastic, for example. A sterilization apparatus, in particular a UV light sterilization apparatus, can be provided at the apparatus, for example, by means of which the injection needle 61 and/or the septum 42 can be sterilized. A sterile filter 41 by means of which the water filled into the container 10 can be filtered or purified can furthermore be provided at the preparation device 4. Tubes 62 and 63 by which the respective substances can be conducted separately from one another can be provided between the preparation device 4 and the source 12 of liquid or the source 11 of baby formula concentrate. Powder, for example, can be sucked from the source 11 of baby formula concentrate that can, for example, be a bag, via the tube 62 that is connected to said source of baby formula concentrate. This can respectively take place in that amount that is required for the desired preparation. Alternatively or additionally, a conveying of the corresponding amount of baby formula concentrate by gravity is conceivable. Provision can be made for this purpose that the source 4 of baby formula concentrate is arranged above the container 10 so that, with a corresponding connection of the two receptacles, a gravity flow of the content of the source 4 of baby formula concentrate into the container 10 is effected or facilitated. The baby formula concentrate can alternatively or additionally be conducted into the container 10 via other supply means, with a spiral conveyor or screw and/or an adaptable chamber being able to be used, for example, to implement different metering processes. It is also conceivable to combine suction with a chamber, etc.

It applies in a similar manner to the conveying of the liquid or of the water, where water can be conveyed for preparation via the corresponding tube 63 by means of a pump and/or of a gravimetric process. The end piece of the corresponding tube 63 for connection to a source 12 of liquid can be configured here such that it, for example, fits onto the closure cap of a Tetra Pak or is couplable thereto. The connector to the source of liquid can also be configured such that a water bottle or a water faucet for mains water can be coupled to the apparatus by it. A corresponding attachment can be provided at the end section of the tube 63 for this purpose. Providing a module container as the source of liquid is also conceivable that has a connector matching the tube 63 to the source 12 of liquid or the same connector as a Tetra Pak, a water bottle, or a water faucet. The container can also be formed as a flexible container such as a bag. The container can furthermore comprise a tube that is fixedly connected thereto and that can be changed together with the container on a container change.

It is conceivable to in particular configure the tube 63 to the source 12 of liquid such that it can be connected to the filter 41 and can in particular be latched or connected by clipping. The liquid or the water is introduced into the apparatus via the corresponding tube 63 and is heated there, with the required amount of heated water being filled into the container 10 or formula container 10 in accordance with a recipe stored in the control/regulation device. More detailed data on the recipe or on the properties of the source 11 of baby formula concentrate or on its preparation can be transmitted from the packaging of the source 11 of baby formula concentrate to the control/regulation device via a barcode, for example, or via another data carrier. Corresponding preparation options that can be carried out by means of the apparatus result from this. Information on the age of the baby formula concentrate, on its composition and/or on other properties of the baby formula concentrate can also be stored at the source 11 of baby formula concentrate and can be transmitted to the control/regulation device.

It is conceivable also to manually input a recipe into the control unit.

The control of the apparatus can take place via an app, for example via a smartphone or a tablet PC, and/or via a remote control. The switching on and off can in particular be controlled in this manner. The app can also provide information on a possibly required exchange of consumption material such as tubes 62 and 63, filters 41, or other materials of the apparatus. In this respect, the control/regulation device can have a wireless LAN connector or another wireless or wired interface. Which metering amount of the baby formula concentrate, which temperature of the liquid, which stirring activities of the agitator 15, and optionally which other parameters should be observed or set by the apparatus for preparing the baby formula can also be seen from the information contained on the packaging of the source 11 of the baby formula concentrate. It is conceivable also to manually input these parameters into the control unit.

A bonding point 65 can be provided at the source 11 of baby formula concentrate via which a further injection needle 61 for removing the baby formula concentrate can be injected into the source 11 of baby formula concentrate.

Figure 3:
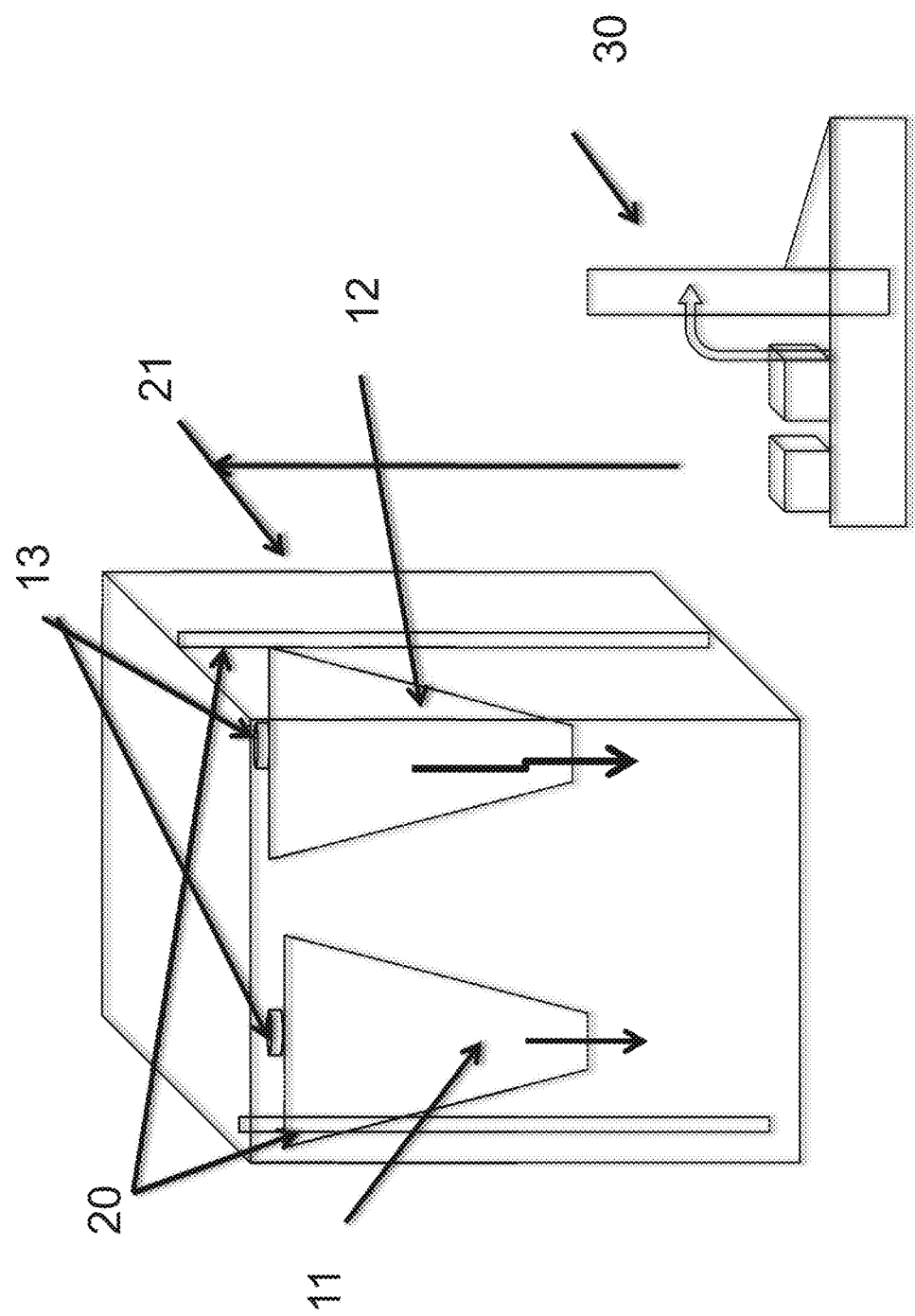
FIG. 3: a detailed view of the preparation device of an apparatus in accordance with the invention.

FIG. 3 shows a more detailed embodiment of the apparatus, with the source 11 of baby formula concentrate or its packaging and the source 12 of liquid being able to be provided at corresponding supports 20. The source of liquid and the source of concentrate can be suspended at the supports. It is also conceivable to clip storage compartments into the supports for storing both sources. The liquid source 12 can here have a screw connection 13 for refilling the liquid. The supports 20 can be coupled in a folding manner to further components of the apparatus so that a footprint that is as small as possible or space requirements of the apparatus that are as small as possible is/are ensured on a storage, for example at the point of sale, in the inwardly folded state of the supports 20.

It is also conceivable to provide covers 21 which can be pulled on in the region of the outwardly folded supports 20, for example, on the outside of the apparatus and which can be designed as films or the like and which can at least partly close or cover the apparatus. The apparatus can also be designed as a completely closed system.

The source 12 of liquid can, for example, be configured as a bag, e.g. for water, which is connectable to the apparatus via the corresponding tube 63. The bag can here by formed as a disposable article and can be discarded after a corresponding period of use of, for example, two weeks and can be replaced by a new one (optionally including the tube kit 6 for water). The necessity of cleaning the source 12 of liquid (plus the tube kit 6 for water) from biofilms or from chemical contamination is thus dispensed with.

Figure 2:
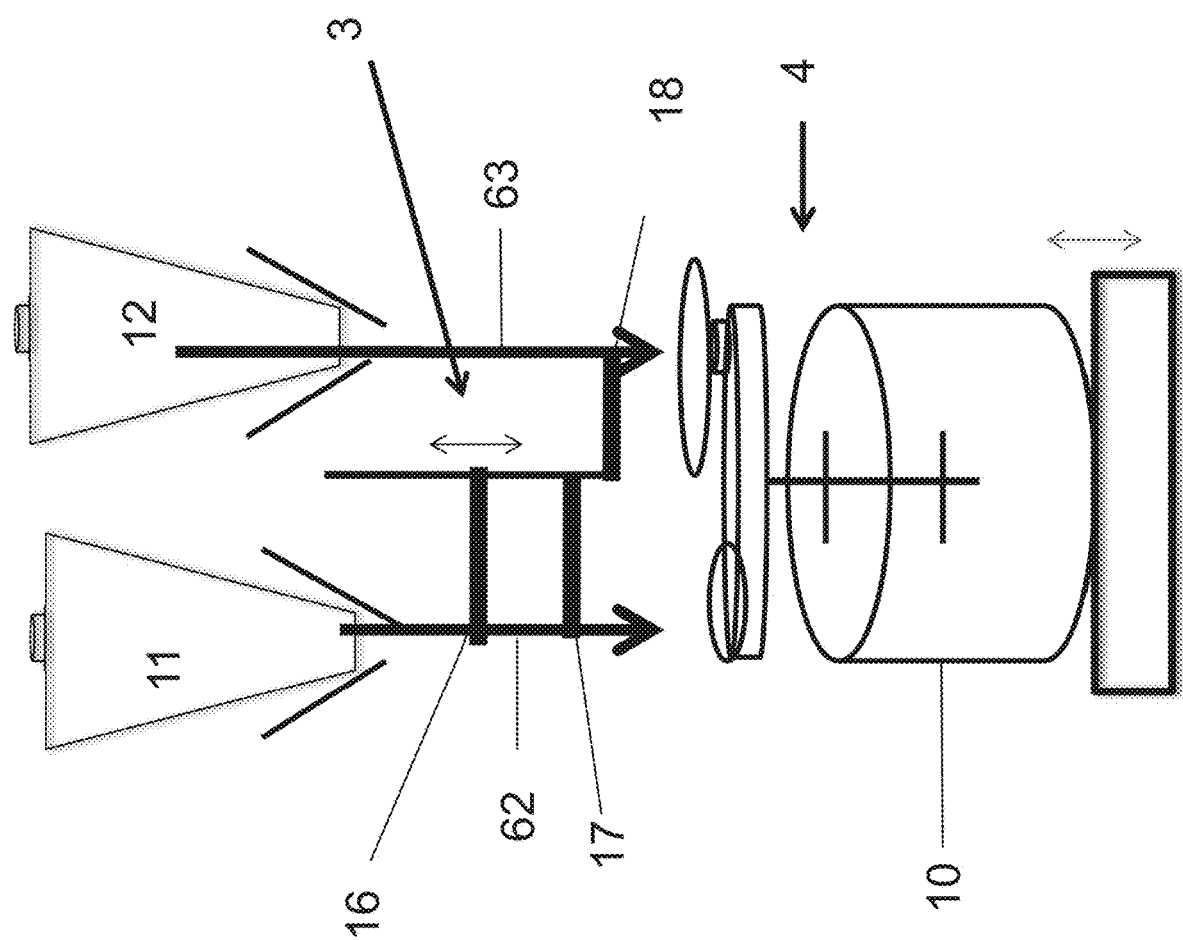
FIG. 2: a detailed view of the design of an apparatus in accordance with the invention for operation with a pressure pump.
Figure 5:
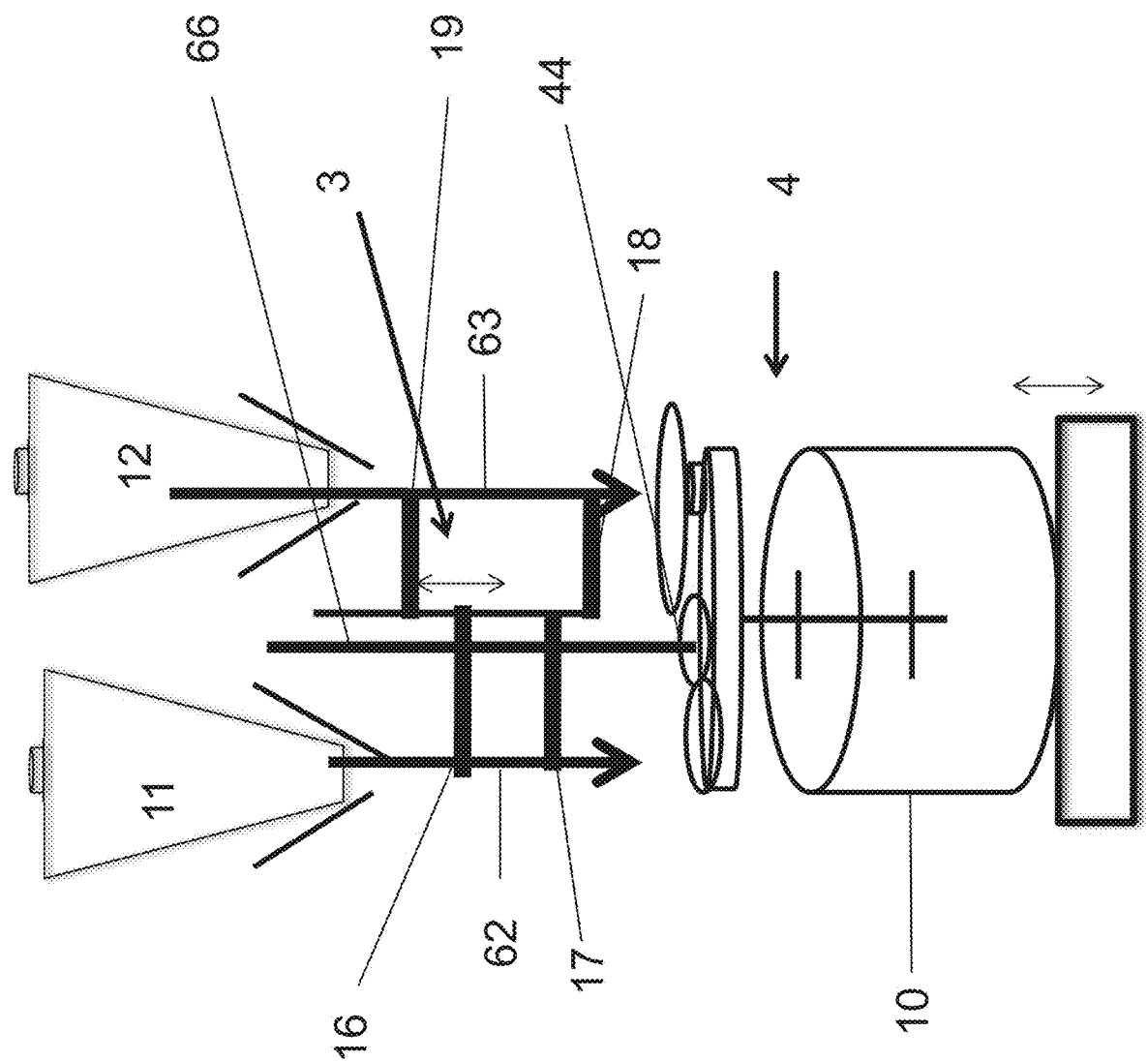
FIG. 5: a detailed view of the design of an apparatus in accordance with the invention for operation with a vacuum pump.

The apparatus can comprise a functional unit 30 that comprises a water heater or the heating device 3, not shown, for heating the liquid, an apparatus for metering the baby formula concentrate, a start button for carrying out the preparation of the baby formula, and further electronic components. The control/regulation device can here be part of said functional unit. The functional unit and/or the control/regulation unit can, for example, comprise a load cell or other sensor apparatus for determining the residual amount of the baby formula concentrate and/or of the fluid. The determination can also take place via the position of the displaceable clamps 16, 17 (FIGS. 2 and 5), with the number of fillings or of preparation procedures being taken into account. An automatic filling can thus optionally e.g. be triggered over the internet to obtain new baby formula concentrate. In this respect, a suitable suggestion for the selection of the baby formula concentrate can be provided by the control/regulation device while taking account of the age of the child to be fed. The order can naturally also be modified manually as required. The functional unit 30 can here be permanently coupled to the further components of the apparatus or can be releasably connected thereto. A similar principle is conceivable for the water (FIG. 2: clamp 18 or FIG. 5: clamps 18 and 19). The system can check in this manner how much water has been removed and can advise the user of a refill. A determination would, however, also be conceivable via a flow sensor, via a time duration measurement of a pump process, or a pressure pump.

Figure 4:
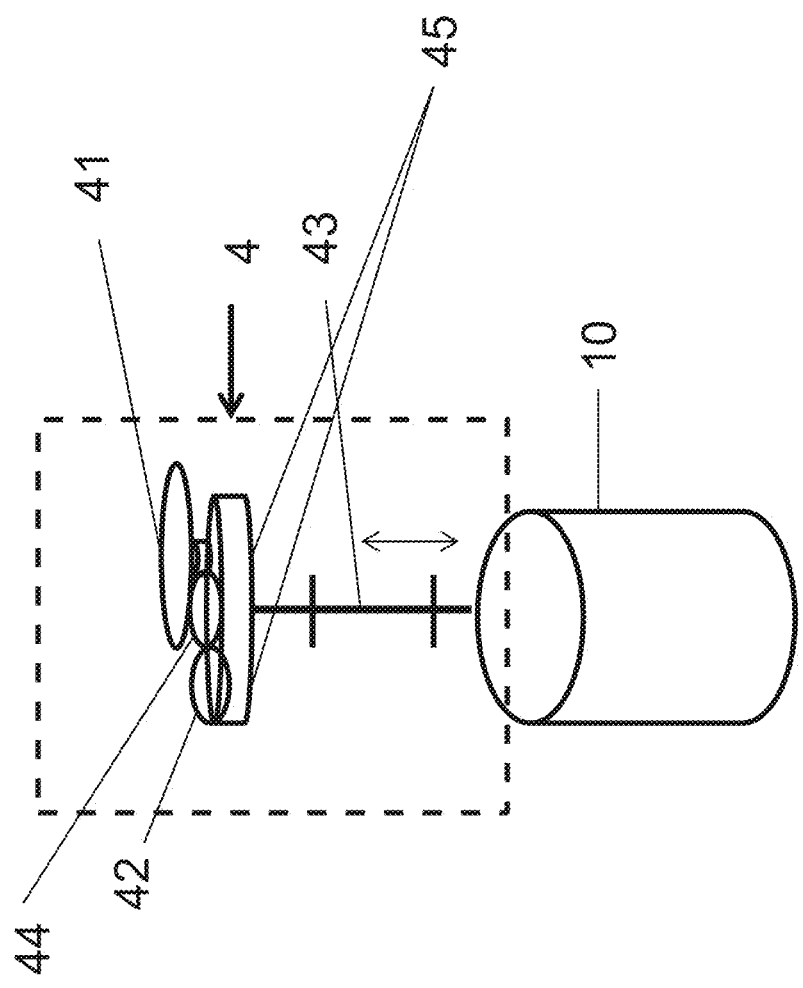
FIG. 4: a detailed view of the design of a further embodiment of the invention.

FIG. 4 shows a more detailed view of a preparation device 4 with a sterile filter 41, a septum 42, and an agitator 43. The preparation device 4 can be at least partly introduced into a corresponding baby bottle 10 or into a corresponding container 10 so that the baby formula concentrate and the liquid can be introduced into the container 10 and can be stirred there. Alternatively or additionally, a configuration of the preparation device 4 with one or more spray nozzles is conceivable that can likewise be used for preparing the baby formula. The preparation device 4 can be replaced after a specific period of use and can, for example, be sterilized in a corresponding sterilizer.

The preparation device 4 can furthermore be telescopically coupled to the total apparatus to be adaptable to different bottle sizes of the container 10. It is also conceivable to provide an adapter at the preparation device 4 by means of which different bottle geometries of containers 10 can be coupled to the preparation device 4. It is furthermore conceivable to provide a temperature sensor and/or pH sensor at the agitator 43 or at the preparation device 4 and said temperature and/or pH sensor can be coupled to the control/regulation device and transmits measurement values to the control/regulation device for monitoring and/or the optimized preparation of the baby formula.

The preparation device 4 or the agitator unit 4, the tube sets 6 for baby formula concentrate and/or water, the water bag or container 12, and/or a water preparation module can here be configured as reusable articles or as disposable articles.

FIG. 2 shows an alternative design of the invention with valves that can, for example, be configured as clamps 16, 17, and 18 and can be controlled or regulated via the supply of water and/or baby formula concentrate. The clamps 16, 17, 18 can here be operated pneumatically or electronically, for example. Further components or reference numerals corresponds to those shown in the further Figures.

The powder metering in particular represents a great challenge. The invention makes this possible very inexpensively. It is furthermore possible to work with disposable articles in this manner.

Clamp 17 can first be closed on the supply of the baby formula concentrate or concentrate while clamp 16 is open. The concentrate can be conveyed up to the clamp 17 or can flow or fall there automatically or on its own. It is conceivable to provide a vibrating device for this purpose that facilitates or enables the concentrate conveying. The clamps 16 and/or 17 can be adapted or positions upwardly or downwardly in accordance with the arrow directions depending on the desired metering amount. This can take place electronically via the control unit or manually. The user can e.g. select a desired recipe or can read it via the scanner. Once the position of at least one of the clamps 16, 17 for the desired metering has been reached, the clamp 16, 17 closer to the container 10 to be filled can be correspondingly closed and the region between the clamps 16, 17 can be filled with concentrate in the desired dose. For this purpose, the clamps 16, 17 individually or together clamp the region of the respective tube clamped by them. The clamp 16, 17 closer to the container 10 to be filled can then be opened while the other one of the two clamps 16, 17 is closed and the correspondingly metered amount of baby formula concentrate can be conducted into the container 10. To enable an outflow of the concentrate (and correspondingly of the liquid in the case of a metering of a liquid) from the region defined by the clamps 16, 17, air can, for example, be introduced into this region via a corresponding air supply for this purpose. Mechanical means can also be provided for conveying the concentrate and/or the liquid from the metering region. The volume setting can thus take place completely in the tube 62 that as a replacement component can be kept clean by corresponding replacement. The metering of the water can take place in the water tube 63 and by means of the corresponding clamp 18 as well as optionally by means of further clamps, not shown, analogously to the above-described metering of the baby formula concentrate.

The preparation device 4 connected to the container 10 can be upwardly traveled on a tray and can connect to the tubes 62 and 63. Alternatively or additionally, it is also conceivable that the hoses are downwardly travelable. The injection needle 61 for the supply of powder into the container 10 can here be injected through the septum 42 of the preparation device 4 or can alternatively be pushed through an opening flap. The water tube 63 that is part of the tube kit 6 can furthermore be connected to the filter 41. The clamp 17 can then open and the concentrate can be introduced into the container 10. The clamp 17 can close and the clamp 16 open after the filling of the container 10. FIG. 2 shows a water supply/filtration via a pressure pump. Clamp 18 can be opened to output the water into the container and closes as soon as the required amount (according to the recipe) has been output. In this aspect of the invention, the water can be conveyed via a pressure pump to enable the filtration. The flow amount can be controlled over time, via a pressure pump and/or via a flow sensor.

The procedure can then, for example, be repeated to fill a next container 10. The clamps 16, 17, and 18 can be configured as reusable components here. The complete clamp control can take place electronically via the control unit or manually.

The powder tube 62 can be designed such that it can receive a maximum amount of powder for the preparation of a baby bottle or of a container 10. This amount can result from corresponding preparation tables for baby food and baby formula. The tube can, for example, have a diameter of 3 cm with a length of 10 cm.

An air filter can further be provided at the apparatus via which air can be introduced by means of which the apparatus can be liberated from any powder residues. A blowing through or puffing out of the apparatus is thus conceivable in which powder residues can, for example, be removed from the tube 62. It would also be conceivable to carry this out for the water tube 63 or for the water tube kit 6 to eliminate water residues.

The source 11 of baby formula concentrate can be formed as a bag with a powder content or as a powder pouch and can, for example, be provided by the respective baby formula manufacturers. The source 11 of baby formula concentrate can, for example, be closable by a screw cap and can be placed into an attachment 64 which can taper conically and in which the injection needle 61 for removing the baby formula concentrate from the source 11 of baby formula concentrate can be provided. A corresponding attachment 64 can also be provided for coupling the source 12 of liquid to the apparatus. The connection to the infeed of the concentrate from the source 11 of baby formula concentrate into the container 10 can be provided via the injection needle 61 here.

A boiling cycle can furthermore be provided in which the water in the source 12 of liquid and in the tube 63 and/or in other regions of the apparatus is boiled, in particular automatically, at specific time intervals or frequencies to reduce the bacterial exposure or the bioburden. The bioburden in the water/tube kit 6 and/or in the source 12 of liquid can hereby be reduced. No boiling is necessary in the preparation of the baby formula since the filter 41 as a sterile filter or virus filter enables the corresponding sterilization without boiling. Provision can in contrast be made to heat the liquid or the water only to the required baby formula temperature or to the consumption temperature of the baby formula.

The water supply of the source 12 of liquid into the container 10 can alternatively also take place or be accelerated via a vacuum (FIG. 5). A preparation device 4 having the connected container 10 can be connected to the tubes 62, 63, and 66. A corresponding vacuum connector can be provided at the preparation device 4 here. The metering with the liquid supply can also take place by means of clamps 18 and 19, with the liquid being able to be supplied by gravity. Clamp 18 is closed; water can be conveyed up to this clamp or can flow up to there automatically (under the effect of gravity). Clamp 19 closes on the reaching of the desired amount. Clamp 18 opens. A vacuum can be applied in the container 10 by the hydrophobic air filter 44. Filtering can hereby take place by the filter 41. The volume results from the tube length and from the tube diameter, and from the spacing of the clamps 18 and 19. After the output amount, clamp 18 closes and clamp 19 opens. The procedure can be repeated until the desired water volume analog to the recipe has been added to the container 10. The clamp 19 can be adapted or positioned up or down in accordance with the arrow direction depending on the desired dosage. This means a volume setting can take place in the water tube 63. Using a sufficiently large tube would also be conceivable to be able to take up the maximum water amount in accordance with the preparation table. It would optionally be possible also to displace the clamp 18. The tube 63 or the water/tube kit 6 and the source 12 of water as replacement components can be kept clean by a corresponding replacement and their contamination can thus be avoided. The complete clamp control can take place electronically via the control unit or manually.

Provision can furthermore be made that a heating cover or a jacket is provided at the containers 10, 12. However, additional or alternative approaches for the heating of the water or of the baby formula differing therefrom are equally conceivable. They can be provided not at the functional unit 30, but rather directly at the containers 10, 12.

The invention enables a separation of water and concentrate in the region of the apparatus, with a combining of the components only being able to take place in the baby bottle or in the container 10. A cleaning of contaminated components can hereby be dispensed with, in particular when the bag assemblies or the containers 11, 12, and 6 are replaced regularly. It would also be conceivable to autoclave the water tube 63 provided it is connected to a Tetra Pak etc. This can also be dispensed with by the use of the sterile filter 41 and by the regular replacement of corresponding components.

Figure 6:
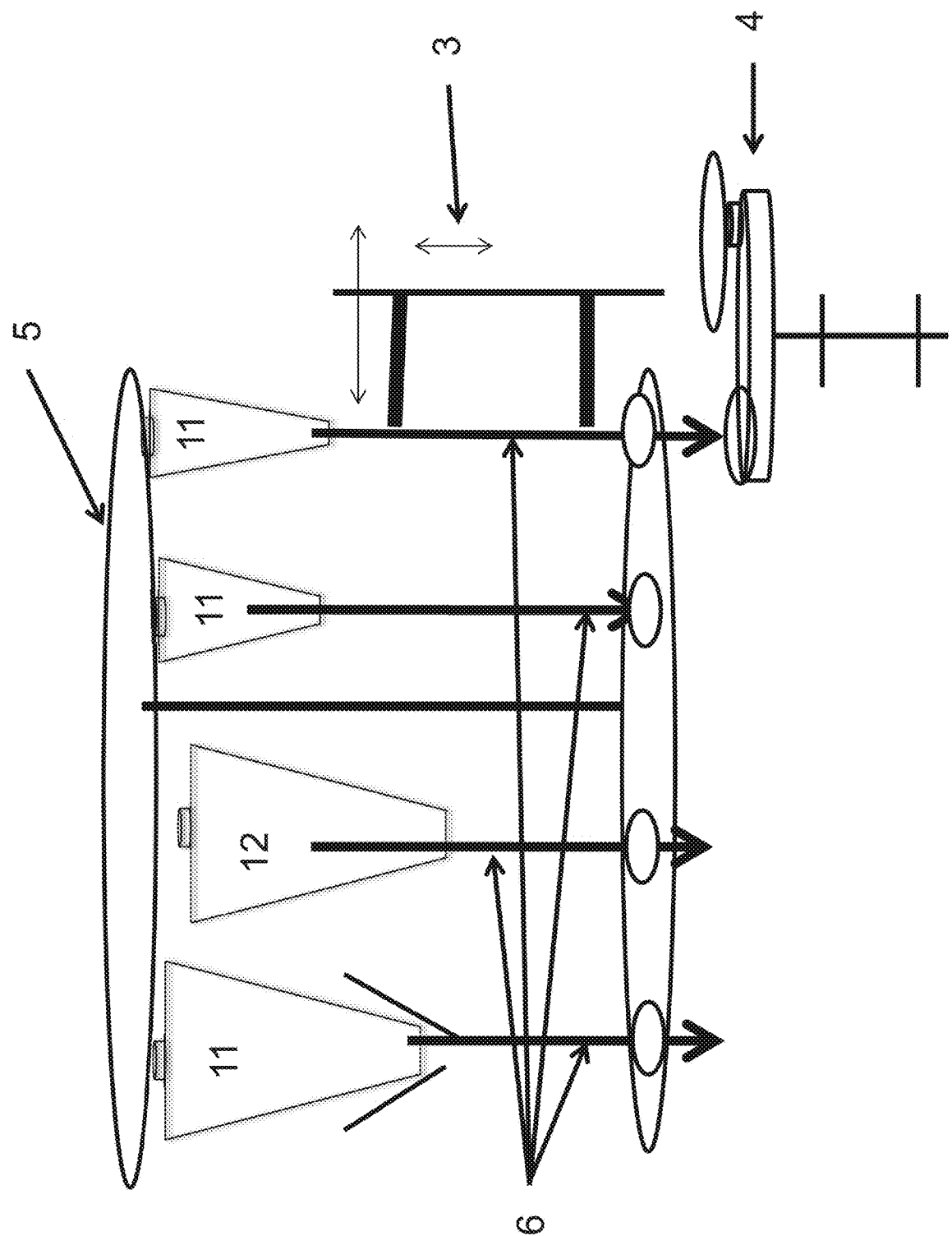
FIG. 6: a detailed view of the design of a further embodiment of the invention. Use of a plurality of sources of concentrate.

FIG. 6 shows an alternative design of the invention. A plurality of different sources 11 of concentrate can be introduced into the apparatus and processed here. They can, for example, contain baby tea, apple juice, etc. Integrating the source of liquid here is also conceivable. In this manner, a clamp set, for example the clamps 18 and 19, could be saved in the metering unit 3.

The rotatable insert 5 can bring the source 11 of concentrate into contact with the metering system 3 as required. It is conceivable that the metering system 3 can be traveled to the tubes 62, 63 and can be traveled away from the tubes 62, 63 after metering has taken place to enable the rotation of the insert 5. Alternative embodiments would be conceivable.

The heating device would switch on or not depending on the concentrate. The information on, for example, the heating time could come from the data on the concentrate packaging (scanning) or could be manually input. The preparation only of water is also possible, with this, for example, including the sterile filtration or preparation by a water treatment module.

In machines designed in accordance with the prior art, the mixing or preparation of the baby formula takes place in the system itself so that these systems have to be laboriously cleaned using chemicals, etc. since baby formula (powder or concentrate together with milk) form an optimal breeding ground for germs. Chemicals in connection with babies are to be considered as worrying here, in particular since the cleaning system can have malfunctions. In addition, the required cleaning operations take up a lot of time. A decalcification that would otherwise be required is a rule is advantageously furthermore likewise no longer necessary. The invention furthermore provides the possibility of using any and all baby formula powders commercially available.

The invention furthermore provides advantageous time savings when using the apparatus. Systems known from the prior art have to boil the water used, which can take from 2 to 3 up to 5 minutes depending on the lime content, since germs have to be killed. The water must be cooled afterward to avoid vitamins or proteins being destroyed. They are heat sensitive. The water does not have to be boiled due to the use of a sterile filter 41 that is regularly autoclaved and the corresponding cooling is also dispensed with. A heating only to the required temperature or temperature of consumption is sufficient. The filter 41 retains all germs such as *legionella*, etc. The use of a virus filter is also conceivable. There is in particular the advantage on the use of a metering and sterilizing bag 14 that unlike in the prior art an immediate availability of the apparatus is enabled by the sterile storage of the boiled water thus possible without having to wait for a sterilization or cooling.

The preparation device 4 creates a closed system with the baby bottle 10; the baby bottle can hereby be stored at the dispenser. Contamination, e.g. due to airborne germs such as mildew, is precluded. A sterilization would be in vain here. A remote control, for example an automatic filling, can be implemented without risk in this manner. Contamination, e.g. by touching, etc., on the sterile side of the filter 41 is also avoided by this system with a corresponding preparation device 4. The preparation device 4 and the baby bottle 10 are connected to one another directly after autoclaving/sterilizing. It is furthermore made possible by the coupling of the container 10 or of the baby bottle 10 to the apparatus via the preparation device 4 to carry out the preparation of the baby food within the container 10.

The systems known from the prior art are large and take up a lot of space at the point of sale. The spatial extent of the present system can be minimized by the use of bags, tube assemblies, and a film 21 that can be pulled on. The film 21 can here represent the housing in which the bags are seated and in which the mechanisms or the components or some of the components of the apparatus are accommodated. The invention thus enables an ideal and fast mixing or preparation of the baby formula, with no other system using an agitator. Unwanted air bubble formation can be prevented or minimized by an agitator in an advantageous embodiment.

The powder metering can take place using an inexpensive metering unit, which enables a disposable concept. The classical metering procedures via taps or chambers can still alternatively or additionally be used. The function of an automatic reordering of ingredients or components is also conceivable with a corresponding interconnection. A load cell can be used for this purpose; or it can be determined whether a reordering is sensible by a simple counting, for example of the filling processes of the tubes 6. The respective applicable metering settings would naturally be taken into account here.

No system is known from the prior art that can process different concentrates, in particular none that prevents the unwanted mixing of different concentrates. This is possible due to the individual tube systems in this invention.

FIG. 7 shows a container that is usable as a source 11 of baby food concentrate and/or as a source 12 of liquid. The container has at least two regions having different cross-sections. At least one of the regions can be formed at least partly in funnel form to simplify the flowing out/trickling out or flowing down/trickling down of substances contained therein. An upper region can be larger than a lower region, with an opening for emptying the container being able to be provided at the smaller lower region. The lower region can serve as a metering line integrated in the container within which the metering of the content required for the preparation of baby food or of other products can take place by means of the clamps 16, 17, 18, 19. This section called a metering line can correspond to the tube described further above for conducting the respective contents. This metering line can be dimensioned in accordance with the maximum volume of the portions that can be produced and/or can comprise a closure for a simple opening of the container.

The container can be produced from a film welded to itself or a plurality of films welded to one another or from other components. It can furthermore be formed as a consumption material that is removed from the apparatus and replaced by a new container after its emptying.

Magnetic or metallic components can be provided at or in the container that can interact with magnets provided at the clamps 16, 17, 18, 19. It is possible by the interaction to pull the container apart by means of the clamps 16, 17, 18, 19 in that region in which the magnet of a clamp 16, 17, 18, 19 sticks to the metallic component of the container. The metallic components can here be provided offset from one another and/or at opposite sides of the container. Accordingly, the magnets of the clamps 16, 17, 18, 19 can likewise be offset from one another, i.e. can be arranged such that the magnets of one clamp 16, 17, 18, 19 in a closed state the clamp 16, 17, 18, 19 do not or do not substantially influence each other, i.e. attract or repel each other.

Alternatively or additionally, further components can be provided that enable an interaction between the clamps 16, 17, 18, 19 and the container.

An embodiment of the container is, for example, conceivable with pockets and/or tabs in accordance with FIG. 8 into which clamps 16, 17, 18, 19 can engage. The clamps 16, 17, 18, 19 placed or engaging therein can accordingly pull the container open in the open state of the clamps 16, 17, 18, 19 and can close it in the closed state of the clamps 16, 17, 18, 19.

FIG. 9 shows an embodiment in which the container can be closed and opened by means of at least two clamps 16, 17, 18, 19 designed as folding clips. If more than two folding clips arranged next to one another are provided, their vertical adjustment can be dispensed with since only selected folding clips have to be opened and others closed for the portioning.

Figure 10:
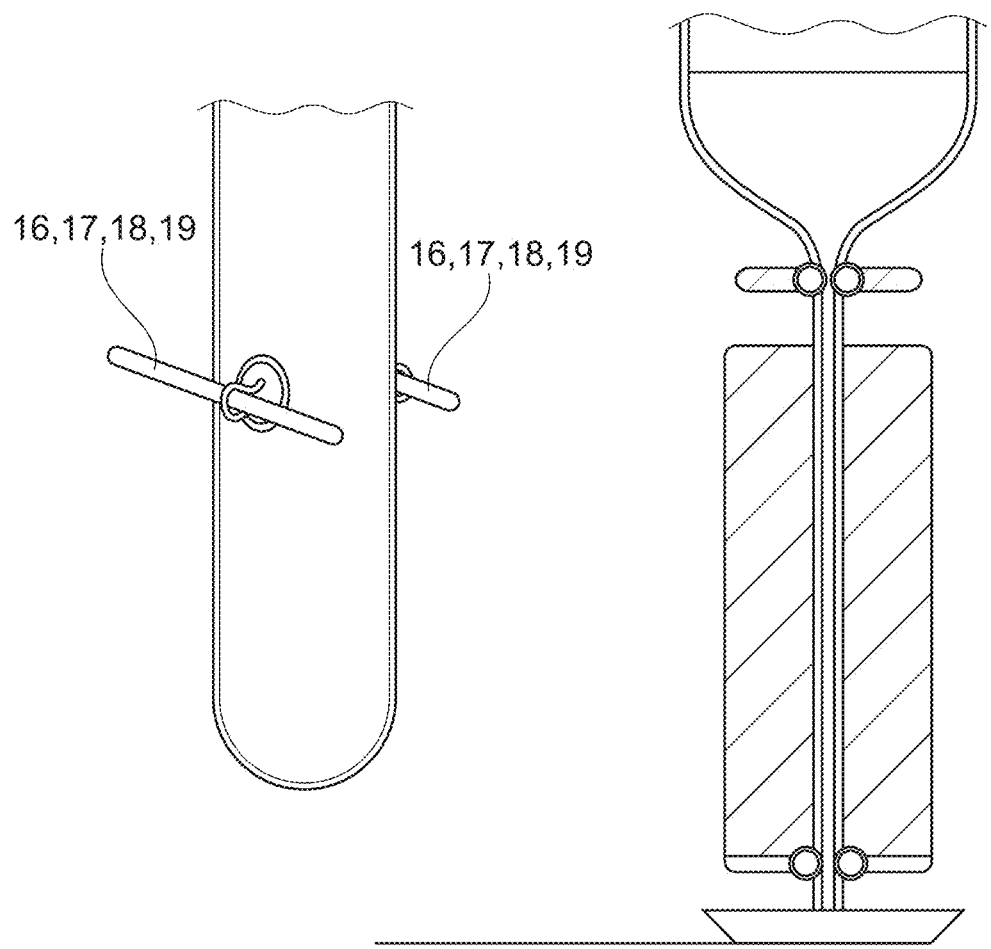

FIG. 10 shows an embodiment in which the clamps 16, 17, 18, 19 are formed, for example, by metal bars which are guided in eyelets provided at the container.

Figure 11:
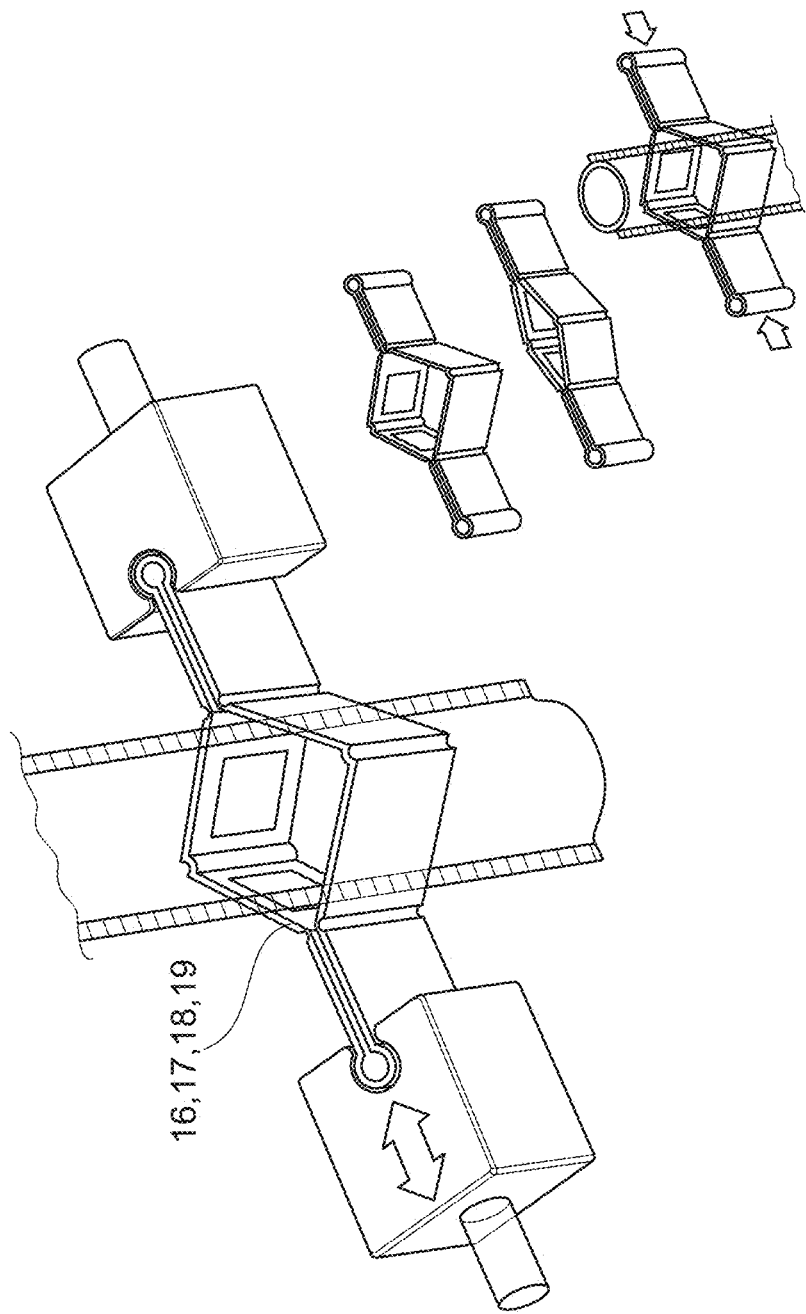

FIG. 11 shows an embodiment in which the clamps 16, 17, 18, 19 are, for example, designed as plastic clamps that can comprise at least one film hinge and adhesive surfaces. The clamps 16, 17, 18, 19 can interact with the container for its opening and/or closing via the adhesive surfaces. The clamps 16, 17, 18, 19 can here be linearly adjustable by means of corresponding actuators. It is also conceivable to rotate the clamps 16, 17, 18, 19 and/or the container in a rotational movement by, for example, 90° to press the container closed by means of the clamps 16, 17, 18, 19.

Figure 12:
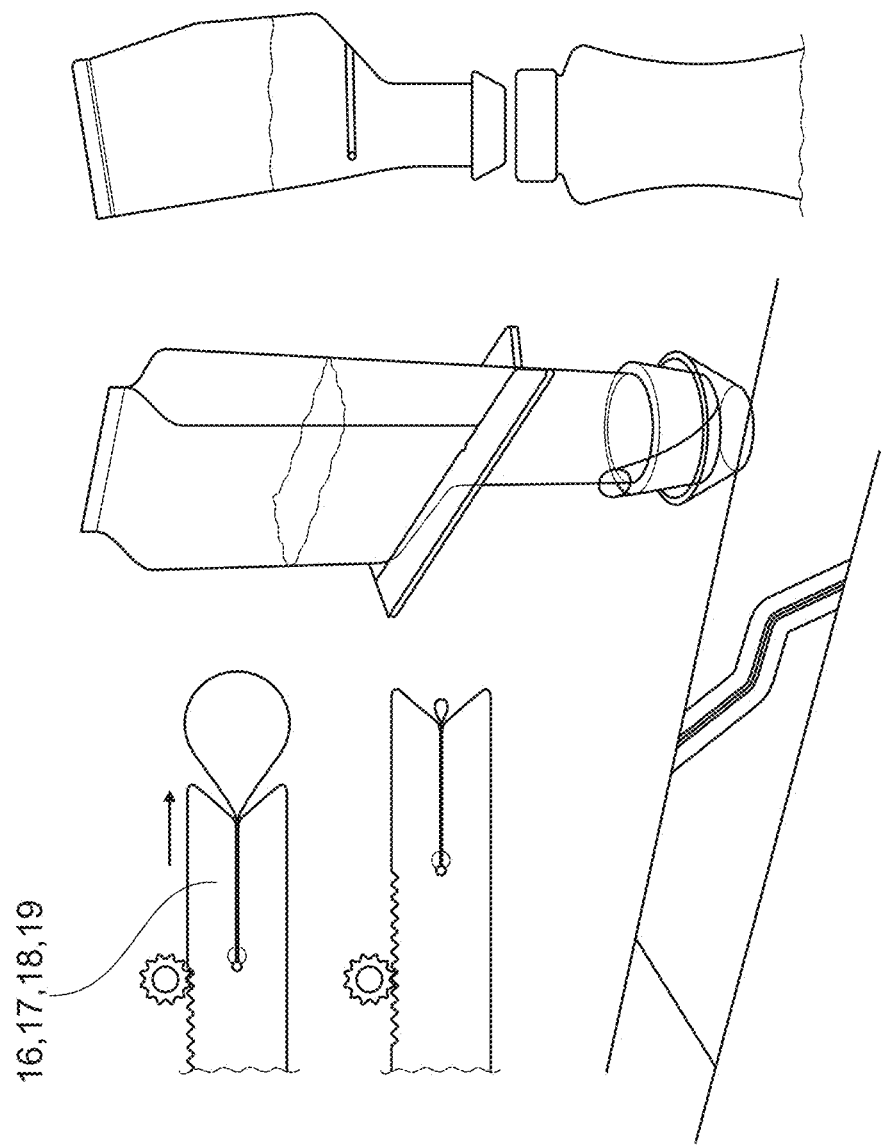

FIG. 12 shows an embodiment in which the clamp 16, 17, 18, 19 is designed as a slider that is linearly movable. Depending on the linear position of the slider, it can change the free tube cross-section or container cross-section. A possible bag shape or container shape and the corresponding bag press cut is also shown in FIG. 12 that allows the manufacture of the container with no offcuts or with only few offcuts. The bag press cut here has a linear region that extends over the total container length and has two shorter linear regions that are in parallel with the first region, that are connected to one another via a connection region, in particular a slanted connection region, and that are differently spaced apart from the first region.

Figure 13:
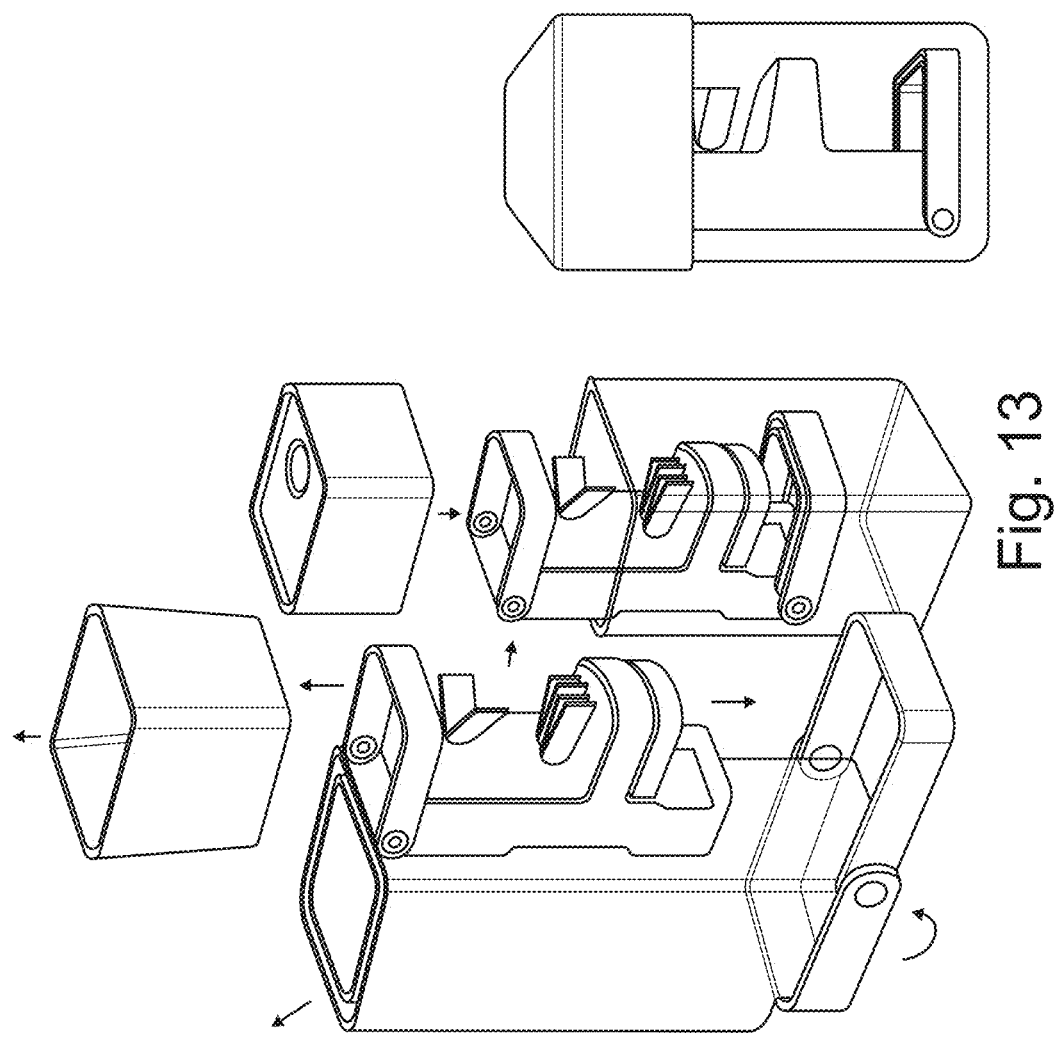
FIG. 13: a compact design of an apparatus in accordance with the invention.

FIG. 13 shows a possible embodiment of the apparatus that can be simply dismantled and assembled and can be put together or stored in a particularly compact manner. The apparatus can here comprise a foldable base that can be folded inward to move the apparatus in. A tank that can, for example, be the source 12 of the liquid of the apparatus can receive other parts of the apparatus for storage. The tank with the further parts of the apparatus stored therein can be closed by means of a cover or covering.

Figure 14:
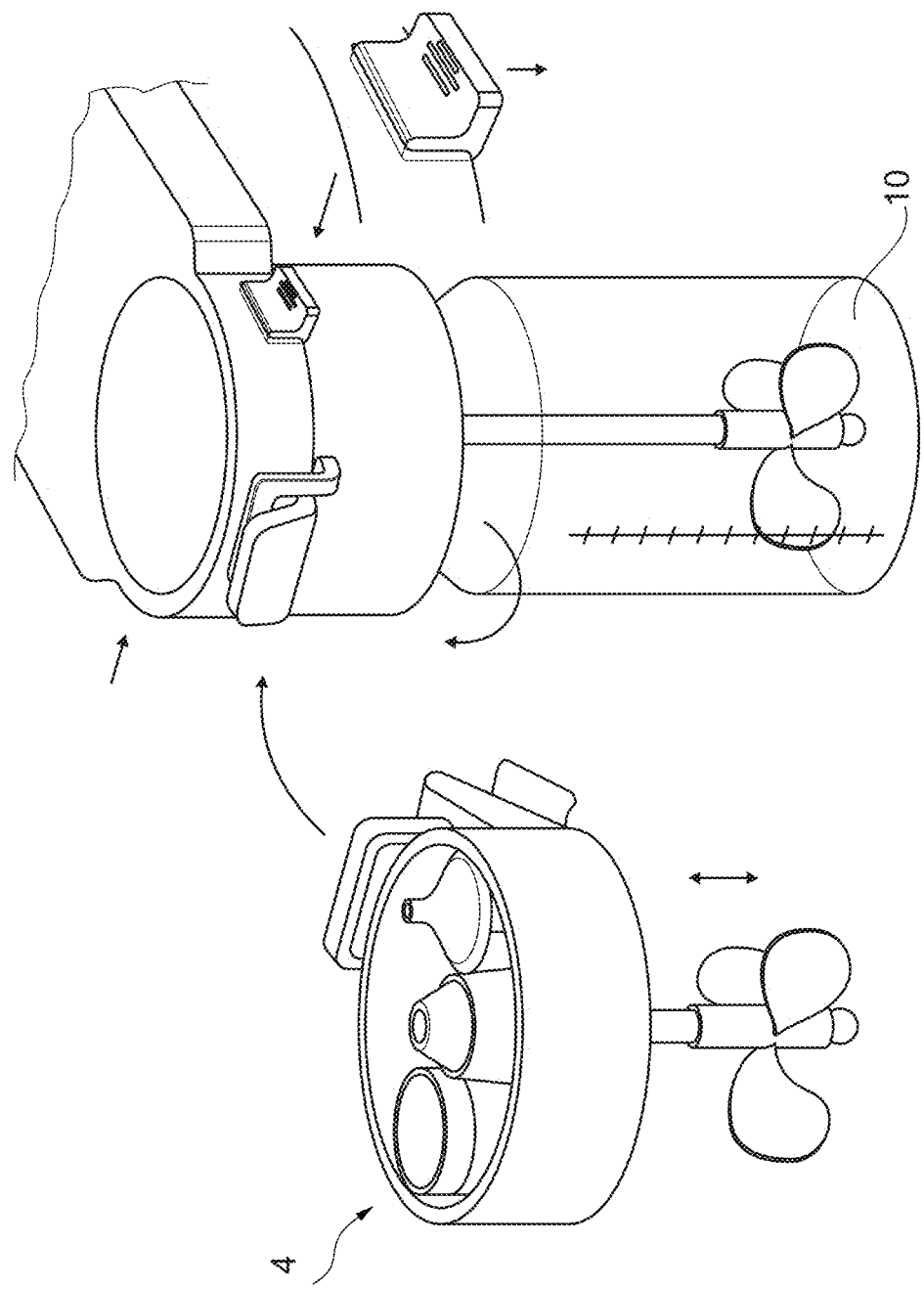
FIG. 14: a preparation device with an adapter.

FIG. 14 shows a preparation device 4 with an adapter by means of which a baby bottle 10 can be particularly simply couplable to the apparatus in accordance with the invention.

A docking section that is in particular vertically adjustable can be provided at the apparatus for this purpose and the adapter can be hung into it, for example at a hook section. Furthermore, at least one button can be provided at the docking section for separating a connection between the adapter and the docking section.

Figure 15:
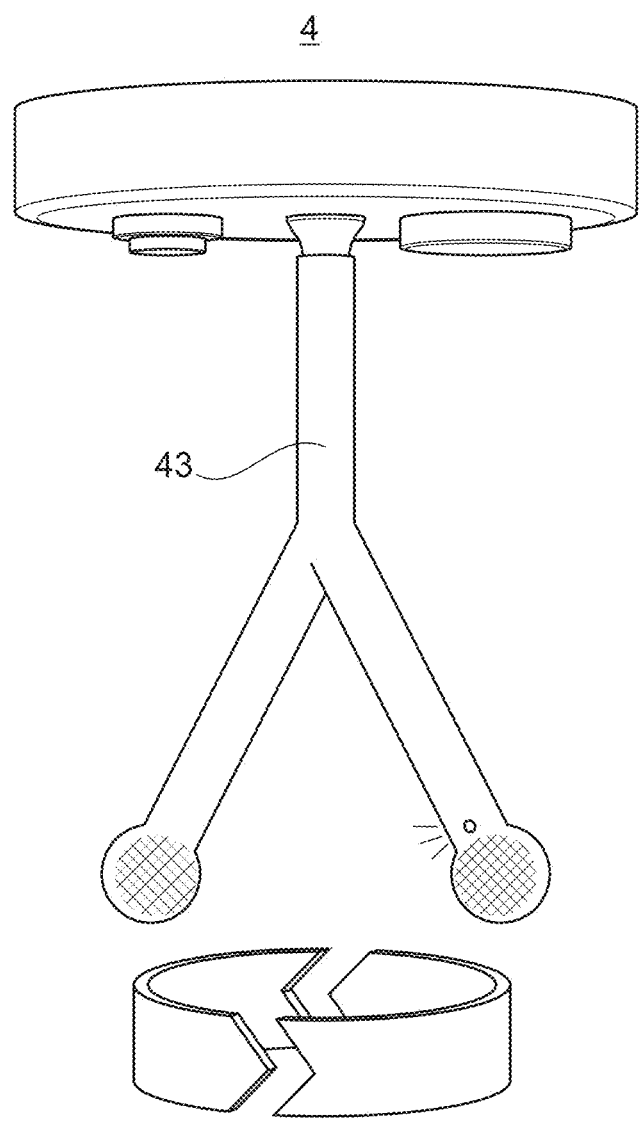
FIG. 15: an agitator of a preparation device with a spray ball.

FIG. 15 shows a possible embodiment of the preparation device 4 in which the agitator 43 can comprise one or more spray balls or spray heads. It is conceivable here that liquid is introduced into the baby bottle 10 or into another container via the agitator 43 and in particular via the spray balls provided at the agitator. The preparation device 4 can thus also in particular be used for cleaning the inner space of the baby bottle. For this purpose, the preparation device 4 having the baby bottle provided thereat can be coupled to a corresponding cleaning apparatus. If cleaning liquid is conducted by the cleaning apparatus into the spray heads, this effects the cleaning of the baby bottle provided at the preparation device 4.

It is possible to design the agitator 43 as rotatable relative to the further structure of the preparation device 4 so that the agitator 43 is driven to rotate mechanically and/or by the fluid flow through the spray ball or the spray balls.

Figure 16:
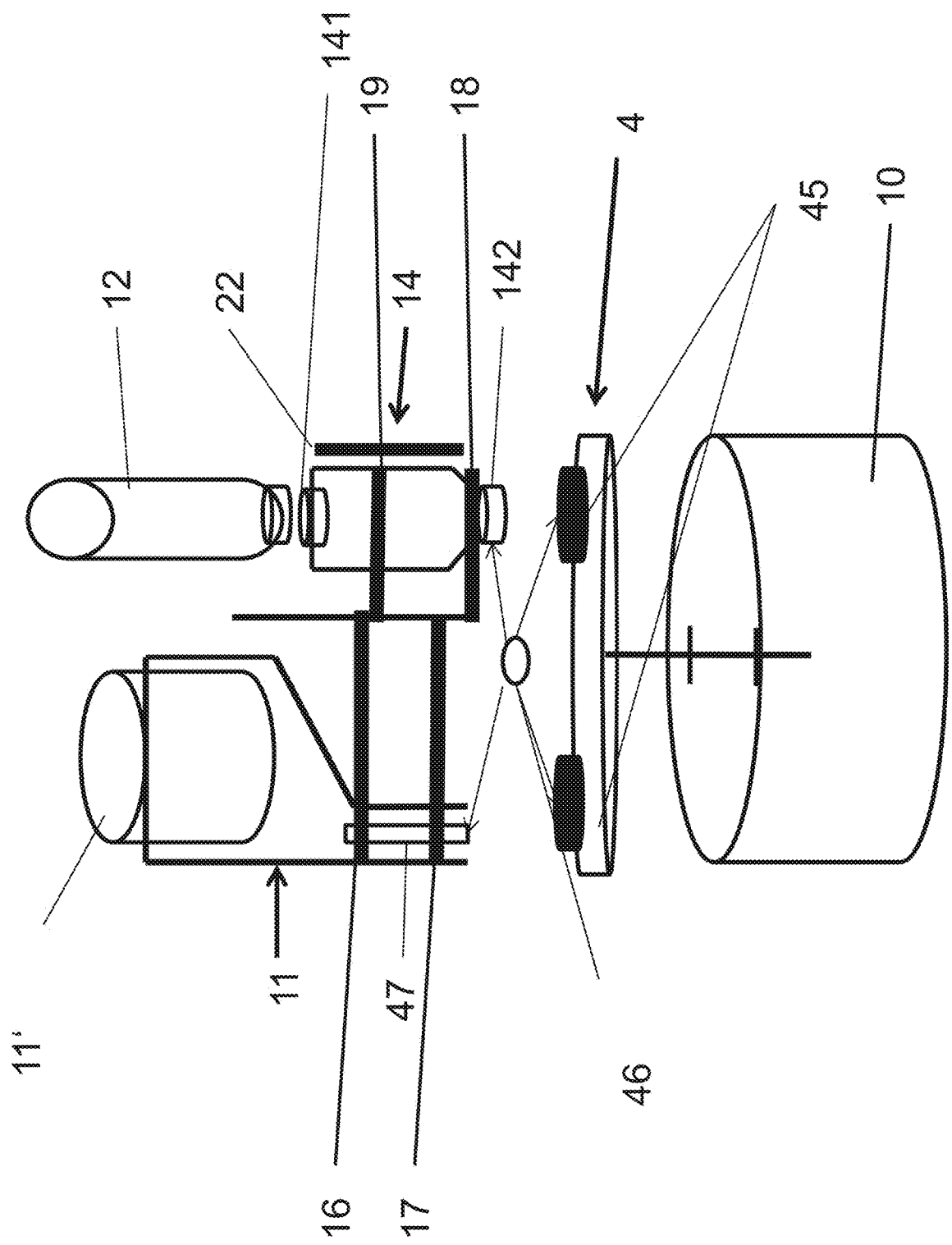
FIG. 16: an embodiment of the apparatus with a metering and sterilizing bag.

FIG. 16 shows an embodiment of the apparatus in which the source 12 of liquid is designed as a Tetra Pak, a water bottle or as another container. The container can be purchased together with the apparatus and/or separately. The source 12 of liquid can be coupled to a metering and sterilizing bag 14 that can be arranged in the apparatus below the source 12 of liquid in the installed state. Liquid can thus flow particularly simply and without the necessity or presence of a pump from the source 12 of liquid into the metering and sterilizing bag 14 following gravity. For this purpose, the clamps 18, 19 can be correspondingly set at the metering and sterilizing bag 14. In this sense, the metering and sterilizing bag 14 can correspond to the tube or tube section in accordance with claim 1 that can interact with the metering device for metering its content. A corresponding metering and sterilizing bag 14 can accordingly also be used for metering and/or sterilizing the baby food concentrate. The bag 14 can taper conically, whereby the flow of concentrate or of liquid through the bag is optimized or facilitated.

The metering and sterilizing bag 14 can comprise a thread 141 or another first connector 141 for coupling the bag 14 to the source 12 of liquid. The bag 14 can thus, for example, be screwed to the source 12 of liquid. The first connector 141 can be provided in an upper region of the bag 14. In a lower region of the bag 14, an opening flap or a closure or a further connector 142 can be provided that prevents the running out of liquid, while a Tetra Pak container and the metering and sterilizing bag 14 connected thereto are, for example, placed or positioned in the apparatus.

The bag 14 and/or the source 11 of baby food concentrate can be coupled to the preparation device 4 and thereby further to the baby bottle 10 via the lower connector 142. Inlet flaps 45 can be provided at the preparation device 4 for this purpose. The preparation device 4 can furthermore comprise an agitator 43 having at least one of the above-named spray balls that can in particular serve the cleaning of the apparatus or of the preparation device 4 and further components of the apparatus in a cleaning device.

A UV light source 46 can furthermore be provided in the region between the source 12 of liquid and the baby bottle 10 and is adapted for the sterilization of the inlets and/or outlets, of the lines, or of the substances contained in the apparatus.

It is possible by means of the adjustable clamps 18, 19 to meter the liquid from the source 12 of liquid within the bag 14. The clamps can be formed for this purpose such that they enable a sterile or partially sterile or temporarily sterile clamping off of the bag 14. In this respect, the clamps 18, 19 can constrict the bag 14 or parts of the bag 14, for example, such that a fluid flow through the region clamped off by the clamps 18, 19 is prevented and thus the penetration of germs is also made more difficult or impossible. A heating and/or cooling plate or a corresponding element 22 can be provided in the region of the metering and sterilizing bag 14 and can be configured to heat and thus to sterilize and optionally to cool liquids located in or metered into metering and sterilizing bags 14. The bag 14 can be produced from correspondingly heat-resistant material for this purpose.

After preparation of the baby food has taken place or after a conducting of the sterilized and/or heated liquid into the baby bottle 10, the bag 14 can again be filled with liquid and a further sterilization of the liquid contained therein can take place by heating. The sterilization can comprise more than one boiling cycle. The clamps 18, 19 close off the bag 14 or parts of the bag 14 or the tube connected to the bag 14 in a sterile manner during the sterilization and thereby further enable the sterile storage of the sterilized liquid. The sterilized liquid thus only has to be heated to drinking temperature in a subsequent preparation. A repeat heating for sterilizing and a cooling to drinking temperature can thus be omitted, which results in substantial time savings in the food preparation.

The source 11 of baby food concentrate can, as shown in FIG. 5, likewise be used via clamps 16, 17 to meter the baby food concentrate. A further baby powder packaging 11' can optionally be provided for this purpose within the source 11 of baby food concentrate. The devices described in FIGS. 7 to 12 for metering the respective contents can be provided at the container of the source 11 of baby food concentrate and/or at the metering and sterilizing bag 14. Magnet elements or metallic elements can, for example, inter alia be provided in or at the respective containers and can interact with the respective magnetic clamps. The magnet or magnets can also be designed as a magnetic strip 47.

The clamps or metering clamps 16, 17, 18, 19 of the source 12 of liquid and optionally the source 11 of baby food concentrate can be configured to close the metering and sterilizing bag in a sterile manner.

The invention claimed is:

1. The combination of a metering device and a bag for use in an apparatus for preparing baby food, the apparatus having a first connector for connecting to a source of baby food concentrate, and a second connector for connecting to a source of liquid, two outlets for filling the baby food concentrate and the liquid into a baby bottle,
    wherein the combination comprises
        the bag is provided for storing and conducting the baby food concentrate or the liquid;
        the metering device is configured for metering the concentrate or the liquid, and comprises a clamp displaceably arranged or a conveying screw arranged at a tube section of the bag to implement different metering amounts; and
        the combination of metering device and bag comprises at least two connectors for conducting the liquid or the concentrate in and out.

2. The combination in accordance with claim 1, wherein the source of baby food concentrate, the source of liquid, and the baby bottle are replaceable components of the apparatus, and require small stowage space.

3. The combination in accordance with claim 1, wherein at least one filter is provided for cleaning and/or sterilizing the liquid.

4. The combination in accordance with claim 1, wherein a device for preparing the baby food from the liquid and the baby food concentrate is provided, and comprises one of an agitator, a spray nozzle, or a spray ball; and the preparation device is replaceable.

5. The combination in accordance with claim 1, wherein a preparation device is couplable to the baby bottle and the bag such that baby formula concentrate and liquid are filled into the baby bottle still separate from one another and mixing of baby formula concentrate and liquid only takes place after the filling of the individual components into the baby bottle and within the baby bottle.

6. The combination in accordance with claim 1, wherein different sources of baby food concentrate are connectable separately from one another such that no mixing of the different concentrates takes place.

7. The combination in accordance with claim 1, wherein at least one pump is additionally provided for supplying the baby food concentrate and/or the liquid.

8. The combination in accordance with claim 1, wherein a control/regulation device is provided by which the apparatus is remote controlled.

9. The combination in accordance with claim 1, wherein a housing is provided which has foldable supports and a cover in the form of a film and which can be pulled on at the outer side of the apparatus to at least partially close or cover the apparatus.

10. A method for preparing baby food, in particular baby formula, comprising using the combination in accordance with claim 1.

11. A method for preparing baby food, in particular baby formula, comprising filling the bag and/or bag/tube kit of the combination of claim 1 with baby food concentrate as a source thereof.

12. The combination in accordance with claim 1, being couplable to a container and additionally comprising an agitator configured for stirring content of the container coupled to it, with the agitator being arranged to comprise one or more spray balls.

13. The combination in accordance with claim 1, wherein means are provided that are configured such that the baby food concentrate and/or the liquid are conveyed by gravity.

* * * * *